(12) United States Patent
Arakawa et al.

(10) Patent No.: US 7,207,553 B2
(45) Date of Patent: Apr. 24, 2007

(54) ENGINE MOUNT

(75) Inventors: Noboru Arakawa, Kasugai (JP); Jyoji Tsutsumida, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 64 days.

(21) Appl. No.: 11/189,734

(22) Filed: Jul. 27, 2005

(65) Prior Publication Data

US 2006/0022390 A1   Feb. 2, 2006

(30) Foreign Application Priority Data

Jul. 30, 2004  (JP)  ............................. 2004-223956

(51) Int. Cl.
  F16M 1/00  (2006.01)
  F16M 3/00  (2006.01)
  F16M 5/00  (2006.01)
  F16M 9/00  (2006.01)
  F16M 11/00  (2006.01)

(52) U.S. Cl. ................. 267/140.5; 267/140.13

(58) Field of Classification Search ............... 267/292, 267/294, 140.11, 140.12, 140.13, 140.4, 140.5; 248/562, 638, 669, 674, 675, 609

See application file for complete search history.

(56) References Cited

U.S. PATENT DOCUMENTS

| | | | | |
|---|---|---|---|---|
| 3,702,178 A | * | 11/1972 | Schulz | 267/140.3 |
| 4,987,679 A | * | 1/1991 | Rau | 29/897.2 |
| 5,039,073 A | * | 8/1991 | Reichard et al. | 267/140.13 |
| 5,271,678 A | * | 12/1993 | Bourgeot | 384/221 |
| 5,460,238 A | * | 10/1995 | Burke et al. | 180/299 |
| 5,954,309 A | * | 9/1999 | Kato et al. | 248/636 |
| 6,270,051 B1 | * | 8/2001 | Power | 248/638 |
| 6,349,918 B1 | * | 2/2002 | Bunker | 248/635 |
| 6,361,030 B1 | * | 3/2002 | Rogge et al. | 267/140.13 |
| 6,511,059 B2 | * | 1/2003 | Seynaeve | 267/140.13 |
| 2003/0030199 A1 | * | 2/2003 | Takashima et al. | 267/140.13 |
| 2005/0178943 A1 | * | 8/2005 | Tsutsumida et al. | 248/560 |
| 2006/0022390 A1 | * | 2/2006 | Arakawa et al. | 267/140.11 |
| 2006/0131798 A1 | * | 6/2006 | Kang | 267/141.1 |

FOREIGN PATENT DOCUMENTS

JP  58-184048 U  12/1983
JP  10-292850  11/1998

* cited by examiner

*Primary Examiner*—Devon Kramer
(74) *Attorney, Agent, or Firm*—Oliff & Berridge, PLC

(57) ABSTRACT

An engine mount having an upper and a lower mounting member connected by a rubber elastic body disposed therebetween, to be installed on a vehicle with a opposition direction of the upper and lower mounting member inclined with respect to a vertical, and an adjustment plate member affixed to the upper mounting member with the adjustment plate member and the lower mounting member elastically connected by the rubber elastic body disposed therebetween. An upper stopper portion is integrally formed by bending a lower end portion of the adjustment plate member toward the upper mounting member so that the upper stopper portion extends generally on a horizontal when installed on the vehicle. A lower stopper portion disposed on the lower mounting member is situated below the upper stopper portion with a gap therebetween. A bound cushion rubber is formed on the upper stopper portion and/or lower stopper portion.

6 Claims, 6 Drawing Sheets

PRIOR ART

ENGINE MOUNT

INCORPORATED BY REFERENCE

The disclosure of Japanese Patent Application No. 2004-223956 filed on Jul. 30, 2004 including the specification, drawings and abstract is incorporated herein by reference in its entirety.

BACKGROUND OF THE INVENTION

1. Field of the Invention

The present invention relates generally to an engine mount interposed between the power unit and the body of an vehicle, for a vibration-damping support of the power unit on the body, and more particularly to an engine mount of novel construction, having a stopper mechanism for cushionwise restriction of the level of displacement of the power unit relative to the body, as well as having spring characteristics that are easily tuned in consideration of the characteristics of the power unit and the body.

2. Description of the Related Art

To date, the practice has been to install a multitude of engine mounts interposed between the body and the power unit of a vehicle, to provide a vibration damping support of the power unit on the body. One known engine mount of this kind has a construction in which a first mounting metal member and a second mounting metal member disposed spaced apart from each other are elastically connected by a rubber elastic body. This kind of engine mount is installed with the first mounting metal member fastened to the power unit via a bracket fitting, and the second mounting metal member fastened to the body via a bracket fitting. With this arrangement, the power unit has a vibration damping support from below, through the agency of the engine mount.

As depicted in FIG. 11, with the engine mount installed in an vehicle, typically, for reasons pertaining to performance in terms of the support characteristics of the power unit 2 by the body 3, the principal axis of elasticity: a in the shear direction of the rubber elastic body 5 making up the engine mount 4 is positioned so as to incline diagonally downward to the inside, towards the center of the power unit 2. The term "inside" refers to the inside of the power unit 2, i.e. the torque roll axis side.

The direction in which the principal axis of elasticity is established in an engine mount has considerable effect on the vibration damping support characteristics of the power unit on the body. It is preferable to set and tune individually the principal axis of elasticity in an engine mount, depending on the particular vibration damping characteristics required for each marque and model of vehicle.

As one approach, JP-U-58-184048 proposes an engine mount of construction wherein the first mounting metal member and the second mounting metal member attached to the rubber elastic body are positioned at a relative incline, so that the direction of the principal axis of elasticity is inclined with respect to the direction of opposition of the first mounting metal member and the second mounting metal member. Another approach, proposed in JP-A-10-292850, is an engine mount of construction wherein, the second mounting metal member to be affixed to the body has a mounting bearing surface that projects out on an incline towards the body side.

Where the direction of the principal axis of elasticity in an engine mount has been established appropriately in this way, new problems are created. Namely, the relative incline angle of the first mounting metal member and the second mounting metal member varies, or the absolute angle of the first mounting metal member and the second mounting metal member varies. These problems make it difficult to set up a stopper mechanism in the bound direction.

Specifically, as taught in the above mentioned documents, in order to provide cushionwise restriction of excessive levels of displacement of the power unit relative to the body, it is important to provide a stopper mechanism in the bound direction in particular. This type of bound stopper mechanism is typically constructed by projecting the first mounting metal member and the second mounting metal member in the generally horizontal direction, situating them in opposition a predetermined distance apart, and forming cushion rubber on their mutually abutting opposing faces.

However, where as described previously the first mounting metal member and the second mounting metal member are inclined relative to one another, or where there is a large absolute incline angle of the first mounting metal member and the second mounting metal member, the two mounting metal members are substantially no longer positioned in opposition in the vertical direction. Thus, it became extremely difficult to form on the first mounting metal member and the second mounting metal member abutting faces of sufficient surface area, as generally flat opposed faces extending in the horizontal direction and positioned in opposition to each other in the bound direction (the vertical direction with the mounting installed).

Specifically, as taught in the aforementioned JP-U-58-184048, the abutting faces in the bound direction must be formed by inclined faces that spread out on an incline with respect to the horizontal. As taught in the aforementioned JP-A-10-292850, in order to form the abutting faces, a large abutting face that projects out appreciably to the outside of the first mounting metal member or second mounting metal member must be formed. Therefore these conventional stopper mechanisms may suffer from difficulty in producing effective load bearing performance in terms of stopper function in the bound direction, and a problem of enlargement in size and weight of the metal members, leading to a problem of adverse effect of the greater weight of the metal members against vibration damping characteristics produced by resonance.

SUMMARY OF THE INVENTION

It is therefore one object of this invention to provide an engine mount of novel construction, capable of setting of an principal axis of elasticity of a mount to be modified easily, without changing an incline angle of mounting faces to a power unit side and/or a body side in upper and lower mounting metal members, and capable of affording advantageous formation of a bound direction stopper mechanism with opposing faces that extend in the generally horizontal direction.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

Mode 1 of the present invention features an engine mount including: an upper mounting member and a lower mounting member disposed in opposition spaced apart from each other and elastically connected by a rubber elastic body disposed between opposing faces thereof, the engine mount adapted to be installed on a vehicle with the upper mounting member fastened to a power unit of the vehicle and the lower mounting member fastened to a body of the vehicle so that a direction of opposition of the upper mounting member and the lower mounting member inclined with respect to a vertical; an adjustment plate member affixed to the upper mounting member on the face thereof opposing the lower mounting member, with the adjustment plate member positioned so as to extend in a flat plate shape inclined relative to the upper mounting member, the adjustment plate member and the lower mounting member elastically connected by the rubber elastic body disposed between opposing faces thereof; an upper stopper portion integrally formed at a lower end portion of the adjustment plate member in an incline direction by bending the lower end portion toward the upper mounting member so that the upper stopper portion extends generally on a horizontal when installed on the vehicle; a lower stopper portion disposed on the lower mounting member and situated in opposition below the upper stopper portion with a vertical gap interposed therebetween when installed on the vehicle; and a bound cushion rubber formed on at least one of opposing faces of the upper stopper portion and lower stopper portion.

In the engine mount constructed according to this Mode, the direction of the principal axis of elasticity can be modified on the basis of the relative incline angle of the adjustment plate member face that opposes the lower mounting member, and the lower mounting member face that opposes the adjustment plate member. As a result, the direction of the principal axis of elasticity can be modified, without making any particular change to the incline angle of the mounting faces of the upper and lower mounting members for mounting onto the power unit side and the body side. Thus, the direction of the principal axis of elasticity can be easily tuned, without any appreciable modification of overall structure, thus advantageously providing greater ease of assembly, lower production costs, and the like, as well as ability to conform efficiently to various vibration damping characteristics.

Accordingly, the upper stopper portion constituting part of the bound stopper mechanism is integrally formed with the adjustment plate member, by bending or inflecting the lower end of the adjustment plate member towards the upper mounting member. By so doing, the incline angle of the upper stopper portion is adjustable on the basis of incline relative to the adjustment plate member, with no appreciable limitations as to mounting conditions of the upper and lower mounting members onto the power unit side or body side. Thus, the upper stopper portion can consistently expand out generally horizontally, advantageously achieving stopper function in the bound direction.

By integrally forming the upper stopper portion with the adjustment plate member which is fastened to the face of the upper mounting member, opposing to the lower mounting member, the fastener member of the upper stopper portion to the upper mounting member may be reduced in size or eliminated altogether. Accordingly, the weight of the components that are fastened to the power unit side, including the upper stopper portion and the upper mounting member, can be reduced. This makes it possible to establish the characteristic vibration frequency of components fastened to the power unit side within a sufficiently high frequency band, thereby eliminating or minimizing deterioration in vibration condition caused by resonance, and ensuring a greater vibration damping effect accordingly.

Specifically, the engine mount of this Mode has the significant technical feature that, since the adjustment plate member is constituted to include the upper stopper portion, in addition to advantageously achieving cushionwise restriction of the level of relative displacement of the upper and lower mounting members in the bound direction, the stopper mechanism affording this advantage can be realized in a compact form, and the desired vibration damping performance can be consistently exhibited.

Mode 2 of the invention features an engine mount according to Mode 1 wherein the adjustment plate member is fastened directly to the upper mounting member in the upper stopper portion.

In this Mode, load bearing performance in the bound stopper direction may be improved more advantageously. The structure wherein the adjustment plate member is fastened directly to the upper mounting member in the upper stopper portion may be realized, for example, by fastening it to the upper mounting member by welding, bolting etc. directly to the outer peripheral edge of the upper stopper portion, or in a linking portion integrally formed with the upper stopper portion.

Mode 3 of the invention features an engine mount according to Mode 1 or 2 wherein a filler rubber integrally formed with the rubber elastic body is inserted at least partially into the gap between the upper mounting member and the adjustment plate member and affixed to the upper mounting member and the adjustment plate member.

In this Mode, during integral vulcanization molding of rubber with the upper and lower mounting members and the adjustment plate member, substantially the entire adjustment plate member is covered by the rubber elastic body and the filler rubber, whereby the width and/or thickness dimensions of the adjustment plate member can be made smaller than where the adjustment plate member lies directly exposed. Thus, on the basis of reduced weight of the fixture, which typically has greater specific gravity than rubber, decline in characteristic values can be more advantageously prevented.

Additionally, the filler rubber may be provided with a hollow that opens to the outside through a gap between the upper mounting member and the adjustment plate member at the upper end in the incline direction of the upper mounting member or the adjustment plate member when installed on the vehicle, and that extends inward (downward in the incline direction) between the upper mounting member and the adjustment plate member. It is possible thereby to further reduce the weight of the portion affixed to the power unit side via the upper mounting member.

Mode 4 of the invention features an engine mount according to any of Modes 1 to 3 wherein a rebound stopper mechanism is formed by providing the upper mounting member with a downward projecting portion that projects vertically downward from a lower end portion of the upper mounting member in the incline direction with a distal end of the downward projecting portion inflected in an "L" shape when installed on the vehicle, thereby integrally forming a rebound abutting portion that extends generally horizontally from the distal end of the downward projecting portion towards a side of the rubber elastic body, and inserting the rebound abutting portion vertically downward of the lower stopper portion in the lower mounting member and positioned in opposition vertically spaced apart, while forming a rebound cushion rubber on at least one of the opposing faces of the rebound abutting portion and the lower stopper portion.

In this Mode, the stopper mechanism for cushionwise restriction of the level of relative displacement of the power unit with respect to the body in the generally vertical separation direction (rebound direction) of the power unit and the vehicle body is constituted to include a lower stopper portion which is also used as a rebound stopper mechanism, thereby reducing the number of parts and facilitating manufacture.

Mode 5 of the invention features an engine mount according to Mode 4 further comprising: a first horizontal stopper mechanism formed such that a distal end face of the lower stopper portion in a projection direction from the lower mounting member is positioned in opposition spaced apart in the projection direction from an inside face of the downward projecting portion of the upper mounting member, with a projection direction cushion rubber formed covering at least one of opposing faces of the lower stopper portion and the downward projecting portion; and a pair of width direction abutting portions formed on either side of the downward projecting portion of the upper mounting member in a width direction by means of that the lower stopper portion projects further towards a projection direction distal end from the lower mounting member, so as to be situated in opposition spaced apart in a projection width direction with respect to width direction end faces of the downward projecting portion of the upper mounting member, with a projection width direction cushion rubber formed covering at least one of opposing faces, to constitute a second horizontal stopper mechanism.

In this Mode, in addition to the first horizontal stopper mechanism and the second horizontal stopper mechanism sharing the use of the lower stopper portion of the lower mounting member and the downward projecting portion of the upper mounting member, the bound stopper mechanism of Mode 1 of the invention is constituted to include the lower stopper portion. Thus, by specifying a first horizontal direction as the vehicle lateral direction (vehicle sideways direction) and a second horizontal direction as the vehicle lengthwise direction, stopper mechanism adapted to various vibration directions can be achieved compactly with simple construction.

As will be apparent from the preceding description, the engine mount of construction according to the present invention permits that an adjustment plate member for adjusting the direction of the principal axis of elasticity of the mounting is integrally formed with the upper stopper portion, thereby functioning as part of the rebound stopper mechanism. Thus, the setting of direction of the principal axis of elasticity of the mounting can be changed easily, and a more compact bound stopper mechanism can be achieved more advantageously, whereby the desired vibration damping effect may be achieved consistently. Additionally, by setting the incline angle of the upper stopper portion on the basis of the incline angle with respect to the adjustment plate member, extension of the upper stopper portion in the horizontal direction may be consistently assured, so that excellent stopper functionality is achieved.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
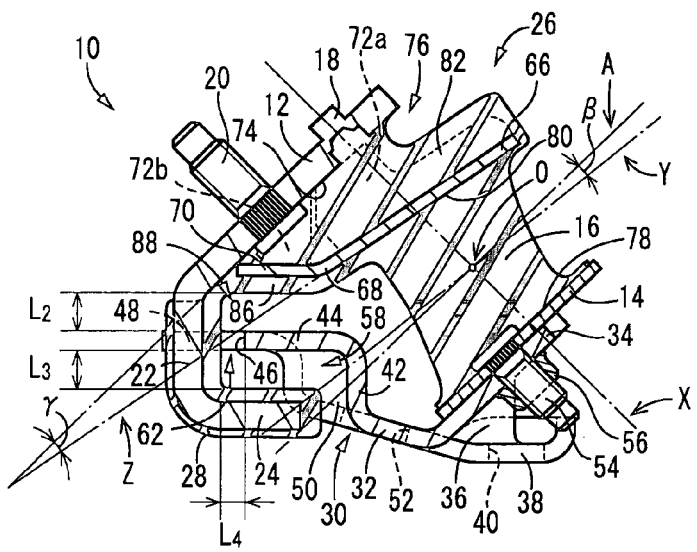
FIG. 1 is an elevational view in vertical cross section of an engine mount of construction according to a first embodiment of the invention.
Figure 2:
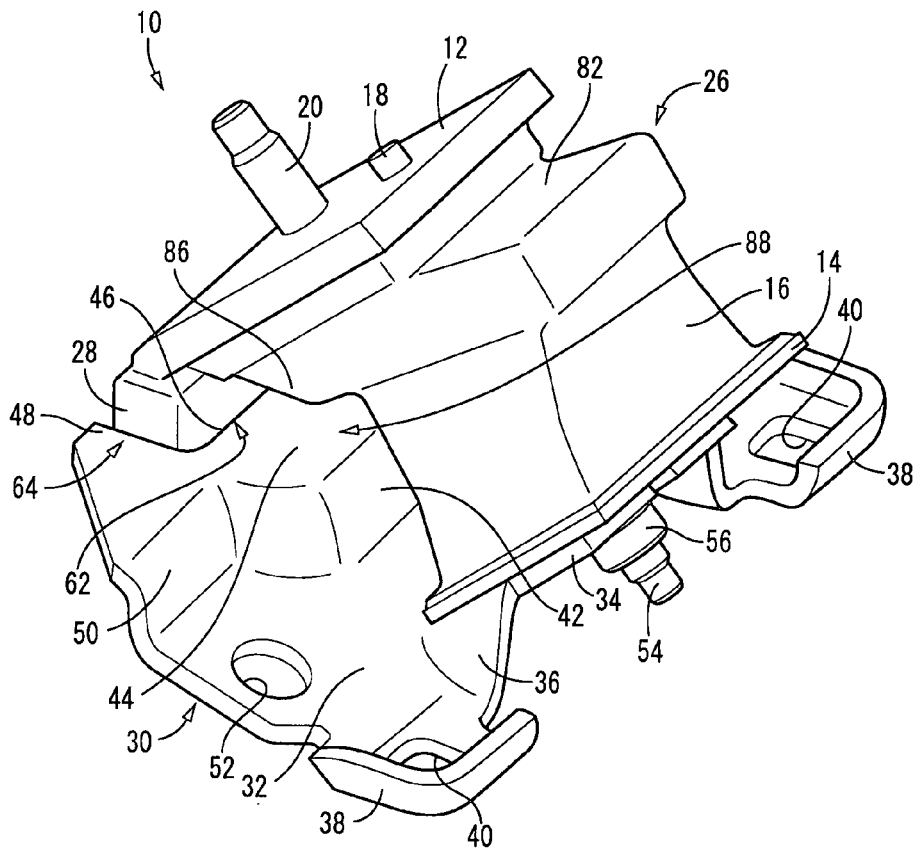
FIG. 2 is an enlarged perspective view from a diagonally upper side of the engine mount of FIG. 1.
Figure 3:
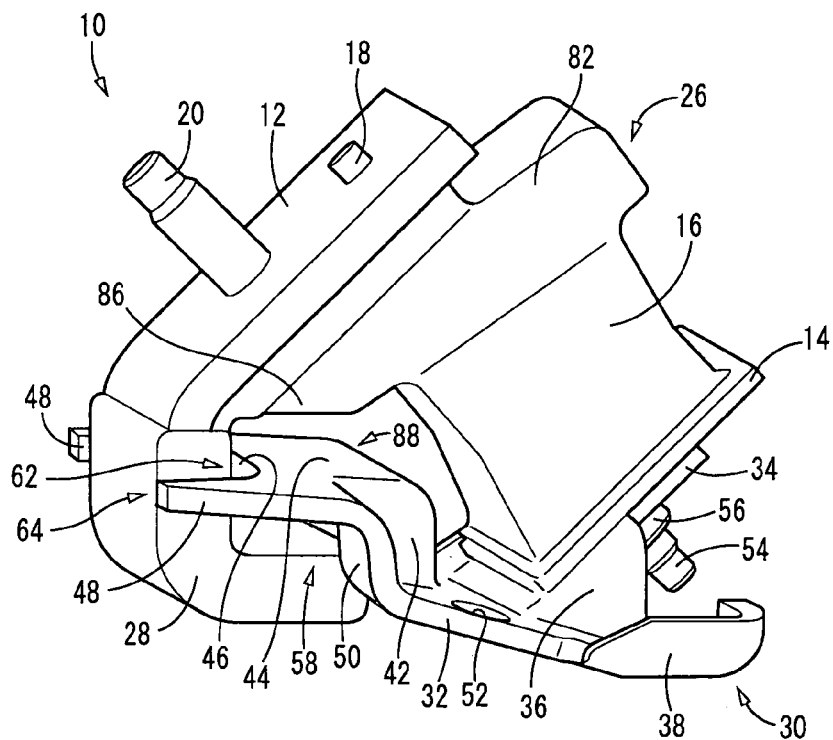
FIG. 3 is an enlarged perspective view from a diagonally left side of the engine mount of FIG. 1.

There will be described a preferred embodiments of the invention for the purpose of providing a more specific understanding of the invention. FIGS. 1–3 depict an automotive engine mount 10 as a first embodiment of the invention. This engine mount 10 has an upper mounting metal member 12 and a lower mounting metal member 14, disposed a predetermined distance apart, and elastically connected to each other by a rubber elastic body 16. In the following description, "vertical" refers to the vertical direction in FIG. 1 unless indicated otherwise.

In greater detail, the upper mounting metal member 12 is of thick, generally rectangular flat plate shape inclined at a predetermined angle with respect to the horizontal (side to side in FIG. 1). In the vicinity of a first lateral end of the upper mounting metal member 12 (diagonal upper right in FIG. 1), a projecting portion 18 of generally cylindrical shape is disposed on an outside face of the upper mounting metal member 12 (diagonal upper left in FIG. 1). On the outside face of the upper mounting metal member 12, a fastening bolt 20 is also integrally formed projecting from a location in the vicinity of the other lateral end (diagonal lower left in FIG. 1). That is, the fastening bolt 20 projected leftward in FIG. 1.

On the other lateral end of the upper mounting metal member 12 (diagonal lower left in FIG. 1) is integrally formed a downward projecting portion 22. This downward projecting portion 22 has the form of a generally rectangular flat plate extending a predetermined length vertically downward (down in FIG. 1) from the lower end of the upper mounting metal member 12. The lower distal end portion of the downward projecting portion 22 is inflected in an "L" shape, with a rebound abutting portion 24 integrally formed in the distal end portion. This rebound abutting portion 24 is of generally rectangular flat plate shape and extends generally on the horizontal in a first horizontal direction (rightward in FIG. 1). In this embodiment in particular, the rebound abutting portion 24 is positioned generally vertically below the fastening bolt 20 which is fixed to the upper mounting metal member 12.

The lower mounting metal member 14 is disposed a predetermined distance away from the upper mounting metal member 12. The lower mounting metal member 14 is of generally rectangular flat plate shape, and is inclined at generally the same angle with respect to the horizontal as the upper mounting metal member 12. By means of this design, the upper mounting metal member 12 and the lower mounting metal member 14 are positioned in opposition to one another in a direction orthogonal to the incline direction (in FIG. 1, diagonally downward to the right and diagonally upward to the left) while inclined in the same direction (in FIG. 1, diagonally downward to the left and diagonally upward to the right).

The rubber elastic body 16 is disposed between the opposing faces of the upper mounting metal member 12 and the lower mounting metal member 14. The rubber elastic body 16 is of generally rectangular block shape, and a first axial end face thereof is substantially vulcanization bonded to a face of the upper mounting metal member 12 in opposition to the lower mounting metal member 14, while the other axial end face is bonded to a face of the lower mounting metal member 14 in opposition to the upper mounting metal member 12. By means of this arrangement, the rubber elastic body 16 is constituted as an integrally vulcanization molded product 26 comprising the upper mounting metal member 12 and the lower mounting metal member 14. In this embodiment in particular, the center axis extending in the lengthwise direction of the rubber elastic body 16 (in FIG. 1, diagonally downward to the right and diagonally upward to the left) extends generally parallel to the direction of opposition of the upper mounting metal member 12 and lower mounting metal member 14, whereby the rubber elastic body 16 is positioned inclined at a predetermined angle from the lower mounting metal member 14 side towards the upper mounting metal member 12 side. As will be apparent from the above, the rebound abutting portion 24 extends generally on the horizontal towards the rubber elastic body 16.

A cushion rubber layer 28 is formed covering the downward projecting portion 22 and the rebound abutting portion 24. The cushion rubber layer 28 is integrally formed with the rubber elastic body 16, and covers generally the entire downward projecting portion 22 and rebound abutting portion 24, with a uniform thickness dimension.

A lower bracket 30 is attached to the lower mounting metal member 14. The lower bracket 30 comprises a bottom wall portion 32 of generally rectangular shape in plan view. At one end in the lateral width direction of the bottom wall portion 32 (at diagonal lower right in FIG. 2) a fastening plate portion 34 is integrally formed. The fastening plate portion 34 is of generally rectangular flat plate shape, and rises upward at a predetermined angle from the bottom wall portion 32, with the two lateral edges thereof integrally formed with the lateral center portion of the bottom wall portion 32 via side wall portions 36, 36 of generally triangular shape in side view. To either side in the lateral direction of the fastening plate portion 34 of the bottom wall portion 32 (in FIG. 2, at diagonal lower left and diagonal upper right) are integrally formed a pair of support portions 38, 38 situated in opposition spaced some distance laterally to outside from the side wall portions 36, 36. The support portion 38 has generally rectangular flat plate shape with a rib integrally formed on the outer peripheral edge, and is perforated in the center by a positioning hole 40 of generally rectangular shape in plan view.

At the other end of the bottom wall portion 32 in the lateral width direction (at diagonal upper left in FIG. 2) is integrally formed an upward projecting portion 42. The upward projecting portion 42 has the form of a generally rectangular flat plate extending a predetermined length along the center portion in the lateral direction of the bottom wall portion 32 in the lateral direction (in FIG. 2, diagonally downward to the left and diagonally upward to the right), and projects upwardly at a predetermined incline angle with respect to the bottom wall portion 32. The distal end portion of the upward projecting portion 42 is inflected in an "L" shape, with a lower stopper portion 44 integrally formed at the distal end portion. The lower stopper portion 44 has a generally rectangular flat plate shape, and extends parallel to the direction orthogonal to the upward projecting portion 42.

The two ends of the lower stopper portion 44 in the lateral direction (in FIG. 2, diagonally downward to the left and diagonally upward to the right) project a predetermined length outwardly in the projection direction, beyond a projecting end portion 46 disposed at the distal end of the lower stopper portion 44 in the projection direction (in FIG. 2, diagonally upward to the left). By means of this design, widthwise abutting portions 48 that extend a predetermined length outwardly in the projection direction from the projecting end portion 46 are integrally disposed at the two lateral ends of the projecting end portion 46. In other words, the center portion of one end of the lower stopper portion 44 in the lateral width direction (at diagonal upper left in FIG. 2) opens in a recessed configuration outwardly in the projection direction with the projecting end portion 46 and the pair of widthwise abutting portions 48, 48.

Additionally, at each of the two lateral ends of the upward projecting portion 42 is integrally formed a vertical wall portion 50 of configuration produced by extending these ends laterally outward along the opposing faces of the lower stopper portion 44 and the bottom wall portion 32. By means of this design, the bottom wall portion 32, the upward projecting portion 42, and the lower stopper portion 44 are connected by the pair of vertical wall portions 50, with the upward projecting portion 42, the lower stopper portion 44, and the vertical wall portions 50, 50 having an overall pocket structure that opens upward.

In the bottom wall portion 32 of the lower bracket 30, on each of the lateral sides thereof to either side of the lower stopper portion 44, is formed a fastening hole 52 serving as a bolt fastening location.

The fastening plate portion 34 of the lower bracket 30 is juxtaposed against the lower mounting metal member 14, with a mounting bolt 54 affixed to the lower mounting metal member 14 in the approximate center thereof passed through and a fastening nut 56 threaded onto the mounting bolt 54 to fasten the lower bracket 30.

When assembled in the above manner, a pair of the fastening holes 52, 52 are disposed to both lateral sides of the bottom wall portion 32 of the lower bracket 30, to either side of the lower stopper portion 44. By so doing, the pair of fastening holes 52, 52 are positioned at a location closer to the lower stopper portion 44 than the mounting bolt 54 affixing the lower bracket 30 to the lower mounting metal member 14.

Figure 4:
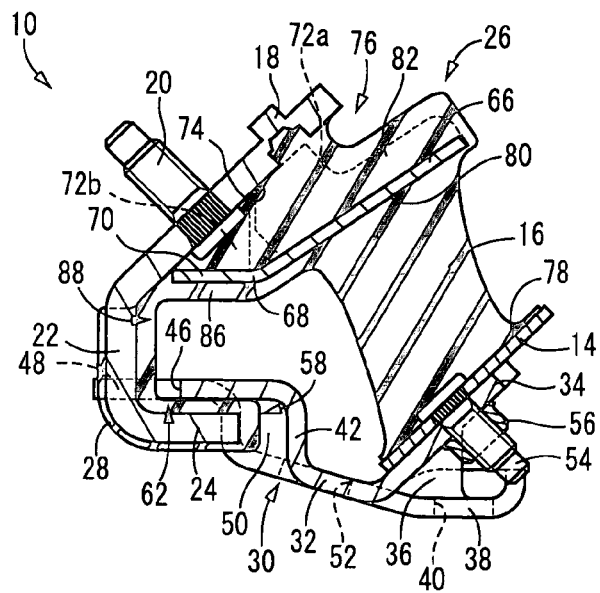
FIG. 4 is a cross sectional view of the engine mount of FIG. 1 in a state before installation on a vehicle, taken along line 4—4 of FIG. 5.
Figure 5:
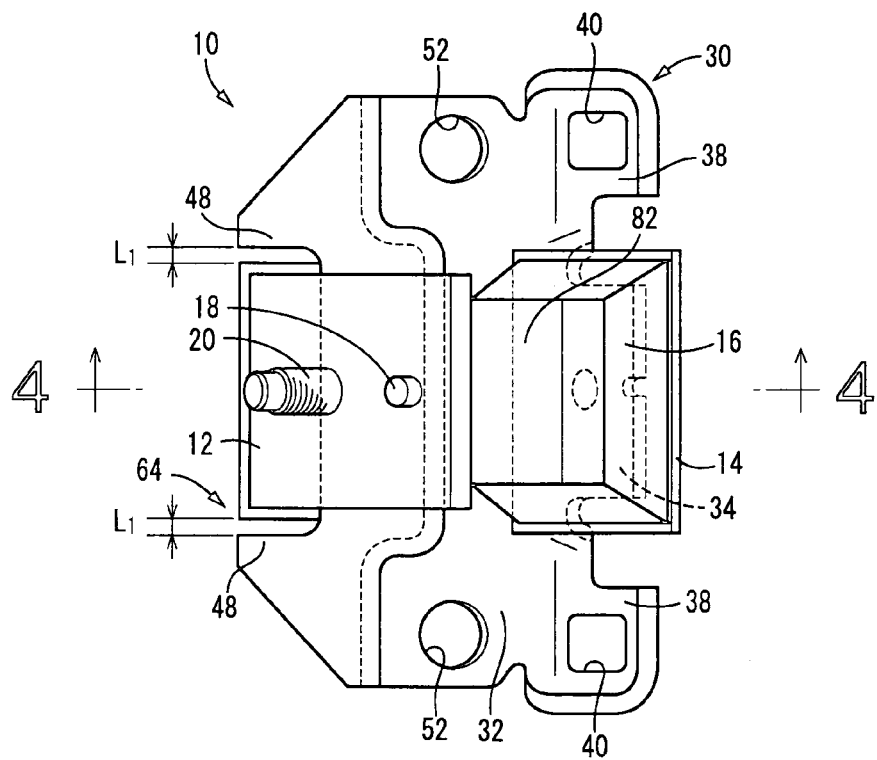
FIG. 5 is a top plane view of the engine mount of FIG. 4.
Figure 6:
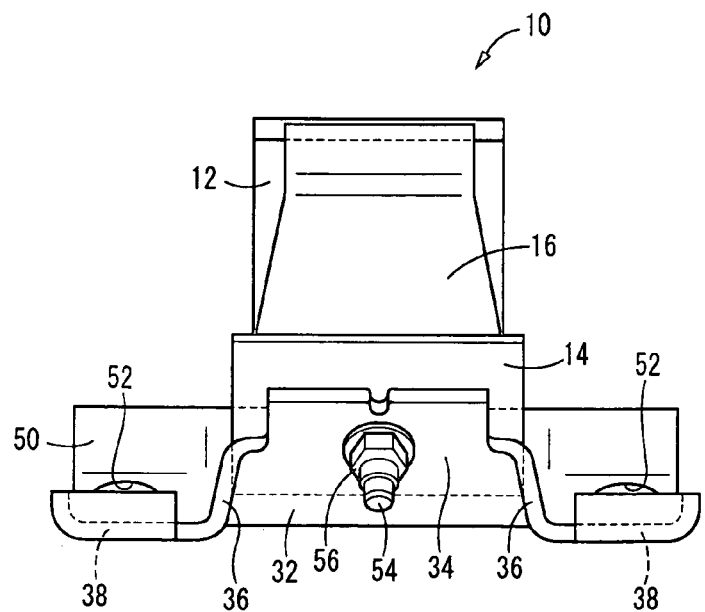
FIG. 6 is a right side elevational view of the engine mount of FIG. 1.

Additionally, the downward projecting portion 22 is inserted between the pair of widthwise abutting portions 48, 48, and the rebound abutting portion 24, via the cushion rubber layer 28 covering it, is positioned a predetermined distance away below the lower stopper portion 44 of the lower bracket 30. Specifically, the rebound abutting portion 24 and the lower stopper portion 44 are positioned in opposition to one another a predetermined distance apart in the vertical direction. By so doing, where installed on a vehicle, when a power unit 60 floats upward with respect to the vehicle body, the rebound abutting portion 24 comes into abutment with the lower stopper portion 44 via the cushion rubber layer 28, on the basis of which the level of relative displacement of the power unit 60 with respect to the body is restricted in a cushionwise manner. That is, a rebound stopper mechanism 58 that provides cushionwise restriction of the level of relative displacement of the upper mounting metal member 12 and the lower mounting metal member 14 in the vertical direction is constituted to include the rebound abutting portion 24, the lower stopper portion 44, and the cushion rubber layer 28. As shown in FIGS. 4–6 as well, before the engine mount 10 is installed on the vehicle, i.e. in an unloaded state in the absence of the static load of the power unit 60 (described later), part of the cushion rubber layer 28 abuts the lower stopper portion 44.

Further, the downward projecting portion 22 and the projecting end portion 46 of the lower stopper portion 44 are positioned in opposition spaced apart from one another in the lateral direction of the mounting (side to side in FIG. 1 and FIG. 5) orthogonal to the width direction, via the cushion rubber layer 28 covering the downward projecting portion 22 on the rubber elastic body 16 side. By means of this design, where installed on a vehicle, when the power unit 60 undergoes relative displacement in the vehicle lateral direction (car sideways direction) with respect to the vehicle body, the downward projecting portion 22 comes into abutment with the projecting end portion 46 of the lower stopper portion 44 via the cushion rubber layer 28, on the basis of which the level of relative displacement of the power unit 60 with respect to the vehicle body is restricted in a cushionwise manner. That is, a lateral stopper mechanism 62 that, with the mounting installed, restricts in cushionwise manner the level of relative displacement of the upper mounting metal member 12 and the lower mounting metal member 14 in the projection direction (horizontal direction) of the rebound abutting portion 24 integrally formed with the downward projecting portion 22 is constituted including the downward projecting portion 22, the lower stopper portion 44 (projecting end portion 46), and the cushion rubber layer 28. In this embodiment, the lateral stopper mechanism 62 constitutes a first horizontal stopper mechanism.

The two widthwise ends of the downward projecting portion 22 are positioned spaced apart by a predetermined distance: $L_1$ in the width direction (the vertical in FIG. 5) from the widthwise abutting portions 48 in the lower bracket 30, via the cushion rubber layer 28 covering the downward projecting portion 22. In other words, the downward projecting portion 22 covered by the cushion rubber layer 28 is interposed between the opposing faces of the pair of widthwise abutting portions 48, with a predetermined gap dimension: $2L_1$. By so doing, where installed on a vehicle, when the power unit 60 undergoes relative displacement in the vehicle lengthwise direction with respect to the vehicle body, the downward projecting portion 22 comes into abutment via the cushion rubber layer 28 with the widthwise abutting portions 48 of the lower bracket 30, on the basis of which the level of relative displacement of the power unit 60 with respect to the vehicle body is restricted in a cushionwise manner. That is, a widthwise stopper mechanism 64 that, with the mounting installed, restricts in cushionwise manner the level of relative displacement of the upper mounting metal member 12 and the lower mounting metal member 14 in the horizontal direction orthogonal to the projection direction of the rebound abutting portion 24 from the downward projecting portion 22 (i.e. the vertical in FIG. 5) is constituted including the downward projecting portion 22, the pair of widthwise abutting portions 48, 48, and the cushion rubber layer 28. In this embodiment, the widthwise stopper mechanism 64 constitutes a second horizontal stopper mechanism. As will be apparent from the preceding description, a rebound cushion rubber, a projection direction cushion rubber, and a projection width direction cushion rubber are integrally constituted by the cushion rubber layer 28 formed covering substantially the entire downward projecting portion 22 and the rebound abutting portion 24.

The compression direction principal axis of elasticity: X, one of the several principal axes of elasticity of the mounting 10, extends in the direction of opposition of the upper mounting metal member 12 and the lower mounting metal member 14, which is the approximate input direction of principal vibration load to the rubber elastic body 16. Specifically, the compression direction principal axis of elasticity: X is established so as to pass through the center of elasticity: O of the rubber elastic body 16 and extend diagonally upward to the left and diagonally downward to the right in a straight line from O in FIG. 1. Additionally, the shear direction principal axis of elasticity: Y, another one of the several principal axes of elasticity of the mounting 10, extends in direction: A generally orthogonal to the direction of opposition of the upper mounting metal member 12 and the lower mounting metal member 14. Specifically, the shear direction principal axis of elasticity: Y is established so as to pass through the center of elasticity: O of the rubber elastic body 16 and extend diagonally upward to the right and diagonally downward to the left in a straight line from O in FIG. 1.

Figure 7:
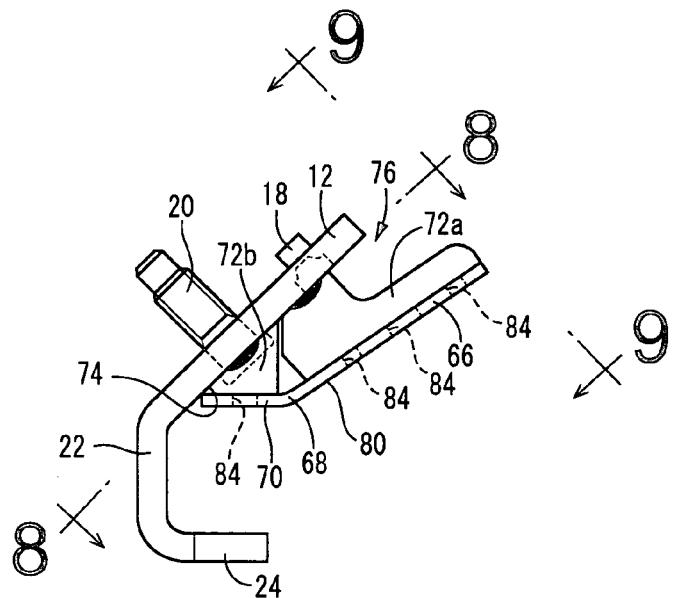
FIG. 7 is a front elevational view of an upper metal member with an inclined plate fitting and an upper stopper portion affixed thereto, which compose the engine mount of FIG. 1.
Figure 8:
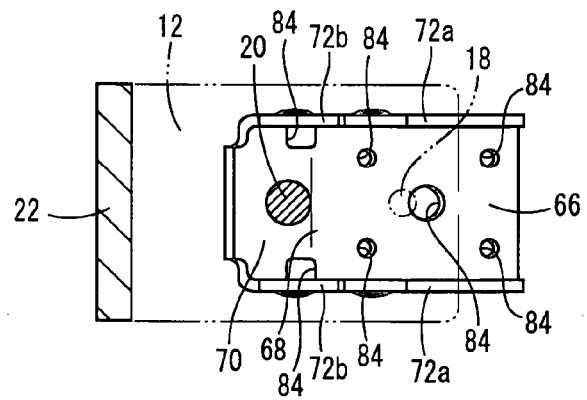
FIG. 8 is a cross sectional view taken along line 8—8 of FIG. 7.
Figure 9:
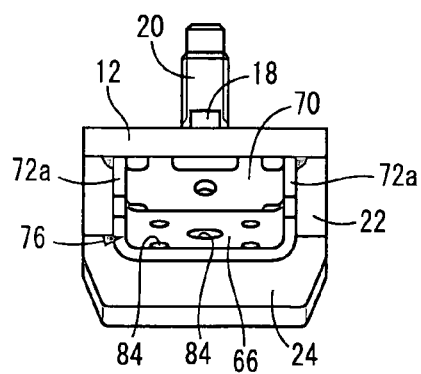
FIG. 9 is an apparent view as seen in a direction indicated by allows 9—9 of FIG. 7.

An inclined plate fitting 66 serving as an adjustment plate member is affixed to the upper mounting metal member 12. As shown in FIGS. 7–9, the inclined plate fitting 66 has generally rectangular flat plate shape of considerable lengthwise extension, with substantially unchanging thickness dimension over its entirety. The inclined plate fitting 66 is disposed at the face of the upper mounting metal member 12 in opposition to the lower mounting metal member 14, so as to extend in flat plate configuration at a relative incline to the upper mounting metal member 12. In this embodiment in particular, the incline angle of the inclined plate fitting 66 with respect to the horizontal plane is established so as to be smaller than the incline angle of the upper mounting metal member 12 with respect to the horizontal plane.

The lower end 68 of the inclined plate fitting 66 in the direction of incline (in FIG. 7, diagonally downward to the left and diagonally upward to the right) is inflected towards the upper mounting metal member 12, with an upper stopper portion 70 integrally formed at the distal end of the inflected portion. The upper stopper portion 70 has a generally rectangular flat plate shape and approximately the same thickness dimension as the inclined plate fitting 66.

At the ends of the inclined plate fitting 66 and the upper stopper portion 70 in the width direction (the vertical in FIG. 8), fastening plate portions 72, 72 are integrally formed by means of press working or the like. The fastening plate portions 72a, 72a integrally formed with the inclined plate fitting 66 and the fastening plate portions 72b, 72b integrally formed with the upper stopper portion 70 have generally triangular or rectangular shape in side view, and project so as to rise generally vertically from the widthwise ends of the inclined plate fitting 66 and the upper stopper portion 70.

The projecting distal end portions (faces) of the two fastening plate portions 72a, 72a of the inclined plate fitting 66 are juxtaposed against the upper edge in a first incline direction (diagonally upward to the right in FIG. 7) of an opposed face 74 of the upper mounting metal member 12 against the lower mounting metal member 14, and affixed by means of welding etc. The projecting distal end portions (faces) of the two fastening plate portions 72b, 72b of the upper stopper portion 70 are juxtaposed to either side of the head of the fastening bolt 20 in the width direction (the vertical in FIG. 8) on the opposed face 74 of the upper mounting metal member 12 against the lower mounting metal member 14, and affixed by means of welding etc. With this arrangement, the inclined plate fitting 66 and the upper stopper portion 70 are fastened to the upper mounting metal member 12 before the rubber elastic body 16 is integrally vulcanization molded with the upper mounting metal member 12 and the lower mounting metal member 14. In this embodiment, the distal end of the upper stopper portion 70 in the projection direction (left in FIGS. 1 and 7) abuts the upper mounting metal member 12. Additionally, a gap 76 of height and width dimensions equivalent to the projection height of the fastening plate portions 72 is disposed between the inclined plate fitting 66, the upper stopper portion 70, and the upper mounting metal member 12.

The lower mounting metal member 14 and the upper mounting metal member 12 with the attached inclined plate fitting 66 comprising the upper stopper portion 70 are set in the forming mold (not shown) for the rubber elastic body 16, the mold cavity is filled with a rubber material for the rubber elastic body 16, and a vulcanization molding operation is carried out to form the integral vulcanization molded product 26.

As a result, the opposed face 74 of the upper mounting metal member 12 against the lower mounting metal member 14 and the opposed face 78 of the lower mounting metal member 14 against upper mounting metal member 12 extend substantially parallel to one another, while inclined at a predetermined (e.g. 45° in this embodiment) with respect to the horizontal plane. The inclined plate fitting 66 is disposed in the medial portion of the direction of opposition of the upper mounting metal member 12 and the lower mounting metal member 14 (in FIG. 1, the direction orthogonal to A), and is inclined by a predetermined angle with respect to the horizontal plane, for example, an angle (35° in this embodiment) smaller than the incline angle of the upper mounting metal member 12 or lower mounting metal member 14. Specifically, the incline angle of the opposed face 80 of the inclined plate fitting 66 against the lower mounting metal member 14 with respect to the horizontal plane is smaller than that of opposed face 74 of the upper mounting metal member 12 against the lower mounting metal member 14 (inclined plate fitting 66) or the opposed face 78 of the lower mounting metal member 14 against the upper mounting metal member 12 (inclined plate fitting 66).

In this state, the end face of the rubber elastic body 16 in a first axial direction (diagonally upward to the left in FIG. 1) is vulcanization bonded to the opposed face 80 of the inclined plate fitting 66, and the end face of the rubber elastic body 16 in the other axial direction (diagonally downward to the right in FIG. 1) is vulcanization bonded to the opposed face 78 of the lower mounting metal member 14. By means of this arrangement, the upper mounting metal member 12 linked to the lower mounting metal member 14 using the rubber elastic body 16 is substantially linked to the lower mounting metal member 14 by the rubber elastic body 16 via the inclined plate fitting 66. As a result, the shear direction principal axis of elasticity: Y of the mounting 10 is established and modified on the basis of the incline angle of the inclined plate fitting 66 with respect to the horizontal plane.

In other words, the shear direction principal axis of elasticity: Y of the engine mount 10 pertaining to this embodiment is angle-adjusted on the basis of the incline direction: Z of the inclined plate fitting 66. Specifically, the shear direction principal axis of elasticity: Y is inclined by an angle β relative to the direction: A generally orthogonal to the direction of opposition of the upper mounting metal member 12 and the lower mounting metal member 14, so as to be adjusted by changing the relative slope angle: γ of the inclined plate fitting 66 with respect to the upper mounting metal member 12.

In this embodiment in particular, filler rubber 82 integrally formed with the rubber elastic body 16 fills substantially the entire gap 76 between the inclined plate fitting 66, the upper stopper portion 70, and the upper mounting metal member 12. Thus, the inclined plate fitting 68 is disposed substantially embedded in the rubber elastic body 16 and the filler rubber 82.

A multitude of lightening holes 84 perforate the inclined plate fitting 66 and the upper stopper portion 70. During vulcanization molding of the rubber elastic body 16 and the filler rubber 82, rubber material circulates to and fills in the lightening holes 84. The shape, size, location, and number of the lightening holes 84 are not limited to those illustrated, and may be modified appropriately in consideration of the weight reduction or load bearing required of the inclined plate fitting 66 and the upper stopper portion 70, or of fixing strength to the rubber elastic body 16.

Accordingly, the upper stopper portion 70 is disposed so as to spread out in the generally horizontal direction (side to side in FIG. 1) vertically below the fastening bolt 20 affixed to the upper mounting metal member 12. As a result, between the opposing faces of the fastening bolt 20 affixed to the upper mounting metal member 12 and the lower stopper portion 44 of the bracket 30, the upper stopper portion 70 is interposed so as to extend parallel to the lower stopper portion 44.

A cushion rubber layer 86, integrally formed with the rubber elastic body 16, that serves as a bound cushion rubber is formed covering the lower stopper portion 44-opposed face of the upper stopper portion 70. By means of this, the upper stopper portion 70 and the lower stopper portion 44 are positioned in opposition to one another spaced apart in the vertical direction, via the cushion rubber layer 86, and extend parallel in the horizontal direction (side to side in FIG. 1).

By means of this arrangement, where installed on a vehicle, when the power unit 60 sinks in the vertical direction with respect to the vehicle body, the upper stopper portion 70 comes into abutment with the lower stopper portion 44 via the cushion rubber layer 86, on the basis of which the level of relative displacement of the power unit 60 with respect to the body is restricted in a cushionwise manner. That is, with the mounting installed, a bound stopper mechanism 88 that provides cushionwise restriction of the level of relative displacement of the upper mounting metal member 12 and the lower mounting metal member 14 in proximity to the vertical is constituted to include the upper stopper portion 70, the lower stopper portion 44, and the cushion rubber layer 86.

Figure 10:
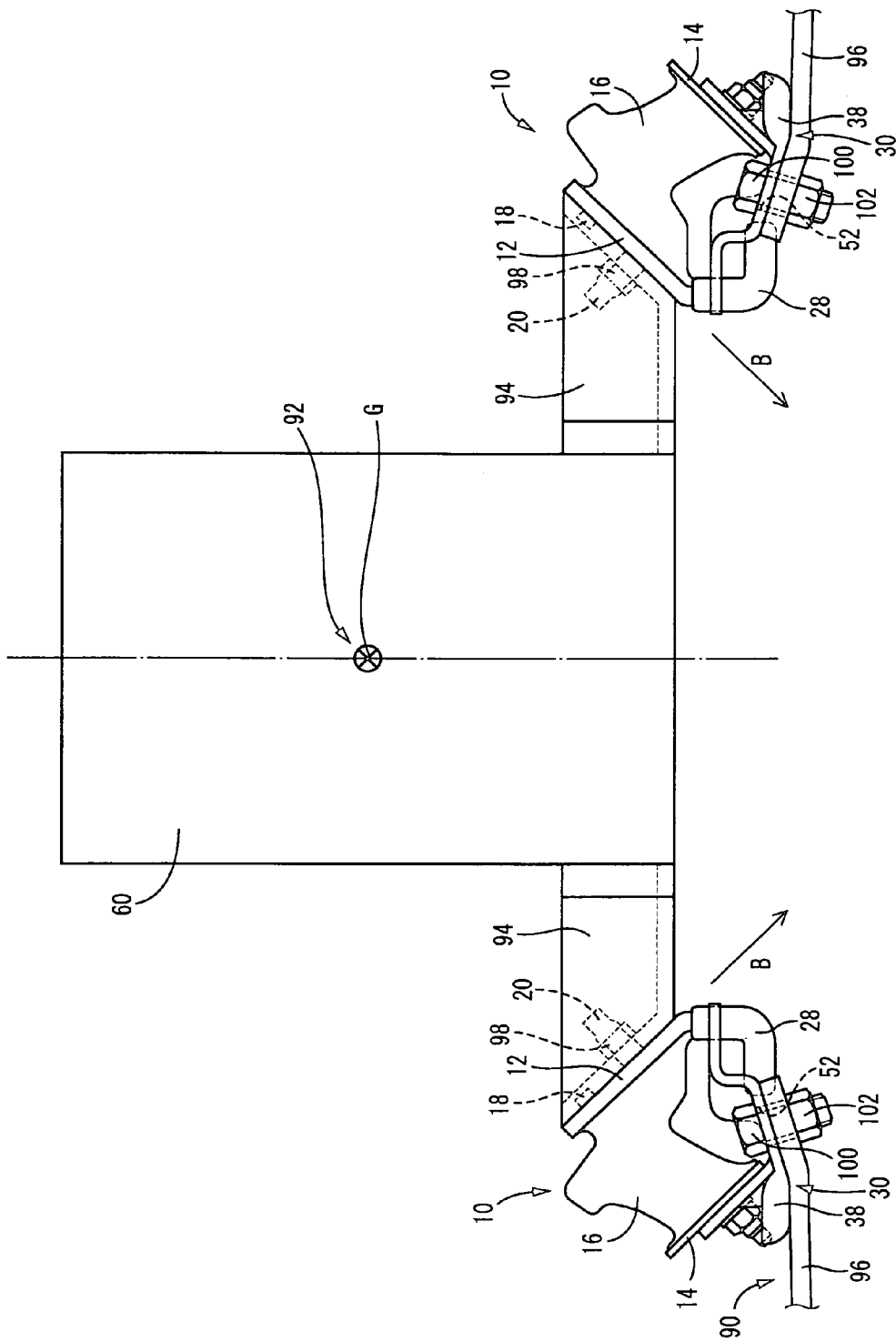
FIG. 10 is a schematic front elevational view showing a pair of engine mounts of FIG. 1 installed on a vehicle.
Figure 11:
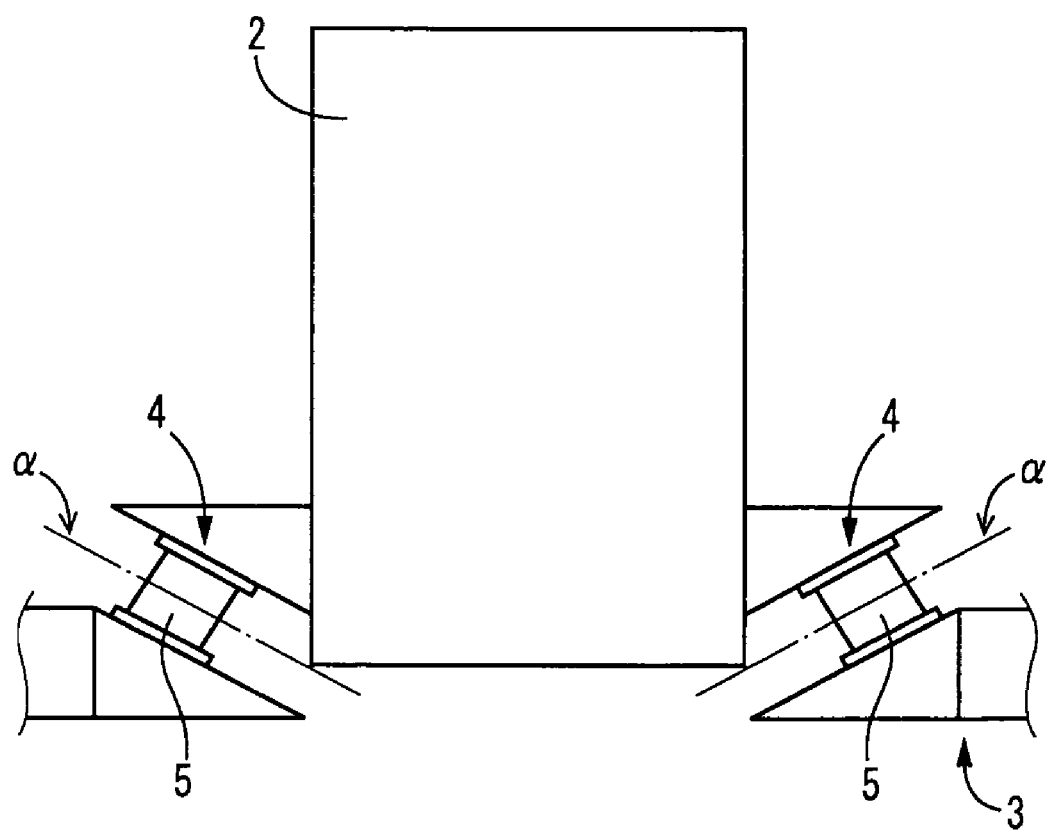
FIG. 11 is a schematic front elevational view showing conventional engine mounts installed on a vehicle.

As depicted in FIG. 10, a pair of engine mounts 10 constructed in this way are installed between the power unit 60 and vehicle body 90. On the power unit 60, which comprises the engine, transmission, etc., are affixed a pair of mounting brackets 94, 94 that are disposed to either side of a principal axis of inertia 92 extending in the generally torque roll axis direction through the center of gravity: G and that extend jutting out in the generally horizontal direction vertically below the principal axis of inertia 92. The end of each mounting bracket 94 is inflected by a predetermined angle (in this embodiment, 45°) and thereby extends diametrically downward towards the inside of the power unit 60, as indicated by B in FIG. 10. On the vehicle body 90, a mounting bearing surface 96 extending generally on the horizontal at a location corresponding to the end of a mounting bracket 94 is formed. Against the end of the mounting bracket 94 on the power unit 60 side, the upper mounting metal member 12 of the engine mount 10 is juxtaposed, and with the projecting portion 18 of the upper mounting metal member 12 engaged in a positioning hole formed at a predetermined location on the end, the fastening bolt 20 of the upper mounting metal member 12 is passed through and secured by a fastening nut 98 threaded thereon. Against the mounting bearing surface 96 on the body 90 side, the lower bracket of the engine mount 10 is juxtaposed, and with a projecting portion disposed at a predetermined location engaged in the positioning hole 40 which perforates the support portion 38 of the lower bracket 30, a fastening bolt 100 is passed through the fastening hole 52 of the lower bracket 30, and secured by a fastening nut 102 threaded thereon. Where mounted in this way, the lower stopper portion 44 of the lower bracket 30 is positioned so as to extend in the generally horizontal direction (side to side in FIG. 10) towards the power unit 60 at the lower end in the incline direction: Z of the upper mounting metal member 12.

Accordingly, to either side of the torque roll axis (principal axis of inertia 92), the pair of engine mounts 10, 10 are mounted between the power unit 60 and the vehicle body 90, with the direction of opposition of the upper mounting metal member 12 and the lower mounting metal member 14 (direction generally orthogonal to B in FIG. 10) inclined with respect to the vertical, and with the shear direction principal axis of elasticity: Y inclined diametrically downward: B towards the inside of the power unit 60, respectively.

In the installed state, the distributed load of the power unit 60 is exerted on the engine mounts 10, and the rubber elastic body 16 undergoes elastic deformation from the state depicted in FIG. 4 to the state depicted in FIG. 1. That is, when installed a vehicle but in the absence of vibrational load, the lower stopper portion 44 of the lower bracket 30 and the upper stopper portion 70 covered by the cushion rubber layer 86 in the bound stopper mechanism 88 are disposed in opposition spaced apart from one another in the vehicle vertical direction (the vertical in FIGS. 1 and 10) by a predetermined separation distance: $L_2$.

The lower stopper portion 44 of the lower bracket 30 and the rebound abutting portion 24 covered by the cushion rubber layer 28 in the rebound stopper mechanism 58 are disposed in opposition spaced apart from one another in the vehicle vertical direction (the vertical in FIGS. 1 and 10) by a predetermined separation distance: $L_3$. Additionally, the projecting end portion 46 of the lower stopper portion 44 and the downward projecting portion 22 comprising the cushion rubber layer 28 in the lateral stopper mechanism 62 are disposed in opposition spaced apart from one another in the vehicle lateral direction (side to side in FIGS. 1 and 10) by a predetermined separation distance: $L_4$. Further, the widthwise abutting portions 48 of the lower bracket and each one of the widthwise ends of the downward projecting portion 22 covered by the cushion rubber layer 28 in the widthwise stopper mechanism 64 are disposed in opposition spaced apart from one another in the vehicle vertical direction (the vertical in FIG. 5) by a predetermined separation distance: $L_4$.

In this embodiment, the rebound direction, lateral, widthwise, and bound direction stopper mechanisms 58, 62, 64, 88 are each positioned vertically below the mounting location of the fastening bolt 20 as the bolt fastening location to the power unit 60. The fastening bolt 20 of the upper mounting metal member 12 and the fastening hole 52 of the lower bracket are disposed in locations close to the stopper mechanisms.

The engine mount 10 of the construction described is provided with the rebound direction, lateral, widthwise, and bound direction stopper mechanisms 58, 62, 64, 88. Thus, when predetermined vibrational load in each direction is input across the power unit and the vehicle body 90, i.e. across the upper mounting metal member 12 and the lower mounting metal member 14 (lower bracket 30), relative displacement of the upper mounting metal member 12 and the lower mounting metal member 14 is limited in the vibration input direction, by means of abutting of the stopper portion and abutting portion in the stopper mechanism corresponding to the direction of vibration input. When stopper portions etc. in stopper mechanism comes into abutment, the shock exerted on the two abutting portions is improved on the basis of elastic displacement of the cushion rubber layers 28, 86 disposed between the two abutting portions.

Accordingly, in this embodiment, by forming the upper stopper portion 70 by means of inflection of the lower end portion 68 of the inclined plate fitting 66, horizontal extension of the upper stopper portion 70 is consistently assured on the basis of the relative incline angle with respect to the inclined plate fitting 66, whereby effective bound stopper action may be realized.

In this embodiment, by establishing and modifying the shear direction principal axis of elasticity: Y of the mounting 10 on the basis of the incline angle of the inclined plate fitting 66 with respect to the horizontal plane, the incline angle of the upper mounting metal member 12 and the lower mounting metal member 14 with respect to the horizontal plane can be tuned easily, without any special modification. Thus, simplification of the assembly operation and reduction of manufacturing costs can be advantageously achieved, and it becomes possible to conform efficiently to various vibration characteristics.

Further, since the upper stopper portion 70 is integrally formed with the inclined plate fitting 66 affixed to the opposing face 74 of the upper mounting metal member 12 against the lower mounting metal member 14, projection thereof appreciably outward beyond the upper mounting metal member 14 can be avoided. With this arrangement, the weight of components affixed to the power unit side, including the upper stopper portion and the upper mounting metal member, can be reduced as compared to an engine mount of conventional construction in which the upper stopper portion projects appreciably outward beyond the upper mounting metal member, as taught in the aforementioned JP-U-58-184048 and JP-A-10-292850, for example. Thus, a decline in characteristic values in association with greater weight of components fastened on the power unit side can be favorably avoided without adversely affecting resonance or other vibration damping characteristics, so that the desired vibration damping ability is consistently achieved.

In addition, in this embodiment, by positioning the bound stopper mechanism 88 and the rebound stopper mechanism 58 vertically below the fastening bolt 20 fastening the upper mounting metal member 12 to the power unit 60, the fastening bolt 20 is positioned on the line of action of abutting force in the bound direction (the vertical in FIGS. 1 and 10) of the upper stopper portion 70 and the lower stopper portion 44 of the bound stopper mechanism 88 and on the line of action of abutting force in the rebound direction (the vertical in FIGS. 1 and 10) of the rebound abutting portion 24 and the lower stopper portion 44 of the rebound stopper mechanism 58. Thus, in each stopper mechanism 58, 88, when the pair of stopper members come into abutment, moment produced at the bolt fastening location of the upper mounting metal member 12 to the power unit 60 can be effectively reduced.

Further, in this embodiment, the upper mounting metal member 12 and the lower mounting metal member 14 (lower bracket 30) have appreciable support rigidity, by means of being fastened to the power unit 60 and the vehicle body 90 at locations close to the stopper mechanisms. Accordingly, it is possible to establish characteristic vibration frequency in the upper mounting metal member 12 and the lower mounting metal member 14 within a sufficiently high frequency band, and to reduce or eliminate adverse effects on vibration due to resonance, so that better vibration damping action is achieved.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For example, whereas in the preceding embodiment, the inclined plate fitting 66 and the upper stopper portion 70 are affixed to the upper mounting metal member 12 by means of welding four fixing plate portions 72 to the upper mounting metal member 12, the fixing plate portions 72 may be provided where needed, and are not essential components.

As a specific example, the distal end portion of the upper stopper portion in the projection direction (left in FIG. 1) may be fastened directly to the upper mounting metal member 12 by means of welding or the like. Alternatively, a bracket or reinforcing fitting to which the inclined plate fitting 66 or upper stopper portion 70 is affixed may be fastened to the upper mounting metal member 12 by means of bolt fastening or the like, to fasten the inclined plate fitting 66 or upper stopper portion 70 to the upper mounting metal member 12.

Also, whereas in the embodiment hereinabove the opposing face 80 of the inclined plate fitting 66 against the lower mounting metal member 14 is set to a smaller incline angle with respect to the horizontal plane than is the opposing face 74 of the upper mounting metal member 12 against the lower mounting metal member 14, it is not limited thereto it being possible for example to conversely establish an incline angle with respect to the horizontal plane that is greater than that of the upper mounting metal member 12.

In the embodiment hereinabove, on the basis of an inclined plate fitting 66 of unchanging thickness dimension overall which is inclined with respect to the horizontal plane, the opposing face 80 of inclined plate fitting 66 against the lower mounting metal member 14 is inclined relative to the opposing face 78 of the lower mounting metal member 14 against the inclined plate fitting 66, so that the direction of the principal axis of elasticity is tuned. However, this could instead by realized, for example, by varying the thickness dimension of the inclined plate fitting 66 in the direction extending in the horizontal direction, to relatively incline the opposing face 80 of inclined plate fitting 66 and the opposing face 78 of the lower mounting metal member 14.

In the embodiment hereinabove, the lower mounting metal member 14 and the lower bracket are formed as separate elements, but they could instead be integrally formed, so that the lower mounting metal member 14 is integrally disposed on the lower stopper portion 44.

Also, whereas the downward projecting portion 22 and the rebound abutting portion are formed as separate elements from the upper mounting metal member 12, these could be juxtaposed in intimate contact against the outer face of the upper mounting metal member 12 and fastened thereto with bolts etc.

However, where the downward projecting portion 22 etc. and the upper mounting metal member 12, and the lower bracket 30 and the lower mounting metal member 14, are each integrally formed, the structure of the mold for vulcanization molding of the rubber elastic body 16 and mold closing/parting become complicated, and thus in preferred practice, at a minimum the downward projecting portion 22 etc. and the upper mounting metal member 12, or the lower bracket 30 and the lower mounting metal member 14, will be formed as separate elements.

Furthermore, whereas in the preceding embodiment there is shown a pair of engine mounts 10 disposed on an automobile to either side of torque roll axis (principal axis of inertia 92) of the power unit 60, it would of course be possible to situate one or several mounting devices at appropriate locations.

The engine mount which pertains to the present invention may of course be employed as a mounting for placement at locations other than to either side of torque roll axis (principal axis of inertia 92) of the power unit 60, as exemplified herein.

Additionally, whereas in the preceding embodiment there was shown a specific example of the invention reduced to practice in an engine mount 10 of solid type in which the power unit 60 and the vehicle body 90 are elastically linked by a rubber elastic body 16 interposed between the power unit 60 and the vehicle body 90, the invention is not limited thereto, and could instead be reduced to practice in a sealed fluid mounting or any of various other types of engine mounts, for example.

What is claimed is:
1. An engine mount comprising:
an upper mounting member and a lower mounting member disposed in opposition spaced apart from each other and elastically connected by a rubber elastic body disposed between opposing faces thereof, the engine mount adapted to be installed on a vehicle with the upper mounting member fastened to a power unit of the vehicle and the lower mounting member fastened to a body of the vehicle so that a direction of opposition of the upper mounting member and the lower mounting member inclined with respect to a vertical;
an adjustment plate member affixed to the upper mounting member on the opposing face thereof opposing the lower mounting member, with the adjustment plate member positioned so as to extend in a flat plate shape inclined relative to the upper mounting member, the adjustment plate member and the lower mounting member elastically connected by the rubber elastic body disposed between opposing faces thereof;

an upper stopper portion integrally formed at a lower end portion of the adjustment plate member in an incline direction by bending the lower end portion toward the upper mounting member so that the upper stopper portion extends generally on a horizontal when installed on the vehicle;

a lower stopper portion disposed on the lower mounting member and situated in opposition below the upper stopper portion with a vertical gap interposed therebetween when installed on the vehicle; and a bound cushion rubber formed on at least one of opposing faces of the upper stopper portion and lower stopper portion.

2. An engine mount according to claim 1, wherein the adjustment plate member is fastened directly to the upper mounting member in the upper stopper portion.

3. An engine mount according to claim 1, wherein a filler rubber integrally formed with the rubber elastic body is inserted at least partially into the gap between the upper mounting member and the adjustment plate member and affixed to the upper mounting member and the adjustment plate member.

4. An engine mount according to claim 1, further comprising a rebound stopper mechanism formed by providing the upper mounting member with a downward projecting portion that projects vertically downward from a lower end portion of the upper mounting member in the incline direction with a distal end of the downward projecting portion inflected in an "L" shape when installed on the vehicle, thereby integrally forming a rebound abutting portion that extends generally horizontally from the distal end of the downward projecting portion towards a side of the rubber elastic body, and inserting the rebound abutting portion vertically downward of the lower stopper portion in the lower mounting member and positioned in opposition vertically spaced apart, while forming a rebound cushion rubber on at least one of the opposing faces of the rebound abutting portion and the lower stopper portion.

5. An engine mount according to claim 4, further comprising: a first horizontal stopper mechanism formed such that a distal end face of the lower stopper portion in a projection direction from the lower mounting member is positioned in opposition spaced apart in the projection direction from an inside face of the downward projecting portion of the upper mounting member, with a projection direction cushion rubber formed covering at least one of opposing faces of the lower stopper portion and the downward projecting portion; and a pair of width direction abutting portions formed on either side of the downward projecting portion of the upper mounting member in a width direction by means of that the lower stopper portion projects further towards a projection direction distal end from the lower mounting member, so as to be situated in opposition spaced apart in a projection width direction with respect to width direction end faces of the downward projecting portion of the upper mounting member, with a projection width direction cushion rubber formed covering at least one of opposing faces, to constitute a second horizontal stopper mechanism.

6. An engine mount according to claim 1, wherein the opposing face of the adjustment plate member is inclined relative to the opposing face of the lower mounting member so that a direction of a principal axis of elasticity in the engine mount is tuned.

* * * * *